United States Patent [19]

Damico

[11] Patent Number: 4,601,246

[45] Date of Patent: Jul. 22, 1986

[54] SUPPORT ASSEMBLY FOR OVERBED TABLE

[75] Inventor: Frank M. Damico, Neenah, Wis.

[73] Assignee: Thill, Inc., Oshkosh, Wis.

[21] Appl. No.: 607,922

[22] Filed: May 7, 1984

[51] Int. Cl.[4] .............................................. E04G 25/08
[52] U.S. Cl. .................................. 108/144; 248/412; 108/146
[58] Field of Search ............... 108/144, 146, 106, 150; 248/412, 411

[56]  References Cited

U.S. PATENT DOCUMENTS

| | | |
|---|---|---|
| 430,392 | 6/1890 | Maschmeyer . |
| 478,840 | 7/1892 | Biggs et al. .......................... 248/412 |
| 720,549 | 2/1903 | Adler . |
| 2,010,292 | 8/1933 | Campbell . |
| 3,560,033 | 2/1969 | Barkus . |
| 3,715,997 | 2/1973 | Barth . |
| 3,741,514 | 6/1973 | Snurr .................... 108/144 |
| 3,807,574 | 4/1974 | Lanza . |
| 3,890,907 | 6/1975 | Peterson . |
| 3,999,492 | 12/1976 | Emerick . |
| 4,033,543 | 7/1977 | Ponzellini . |
| 4,195,578 | 4/1980 | Benoit et al. . |
| 4,318,526 | 3/1982 | Werner . |

FOREIGN PATENT DOCUMENTS

| | | | |
|---|---|---|---|
| 262549 | 6/1968 | Austria ................................ 248/412 |
| 1449684 | 7/1966 | France ................................ 248/412 |
| 49553 | 10/1910 | Switzerland ........................ 108/146 |

Primary Examiner—William E. Lyddane
Assistant Examiner—Peter A. Aschenbrenner
Attorney, Agent, or Firm—Andrus, Sceales, Starke & Sawall

[57] ABSTRACT

A support assembly (2) is provided for an overbed table (4). A lower pedestal column (6) is mounted on a base (8), and an upper pedestal column (12) is telescopically slideable within the lower column, and supports a table (4). A wedge and roller clutch (14) at the bottom of the upper column includes: wedges (16, 18) fixed to the upper column and extending downwardly from the lower end (20) thereof and having opposing camming surfaces (22, 24); a retainer (26) mounted to a release rod (28) and moveable up and down toward and away from the bottom end of the upper column; and rollers (32, 34) loosely received in the retainer and forced laterally horizontally outwardly against the inner walls (36, 38) of the lower column by the camming surfaces of the wedges to stop downward movement of the upper column and support the table. Downward movement of the release rod and the retainer permits lateral inward movement of the rollers out of forced cammed engagement with the inner walls of the lower column, to permit downward movement of the upper column and table. A counterbalancing return spring (90) biases the retainer upwardly to reduce the effort needed to lift the table and to bias each of the rollers to a proper camming position to be cammed by the camming surfaces of the wedges to a latched condition to support the table. Disclosed features include positive break disengagement means and silencing means. Other features include simplicity of design and efficiency and economy of manufacture, including part tolerances.

5 Claims, 5 Drawing Figures

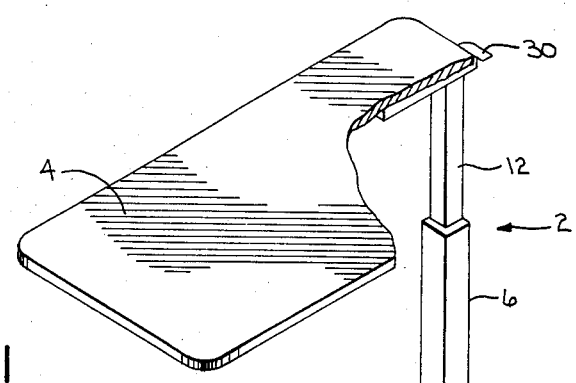
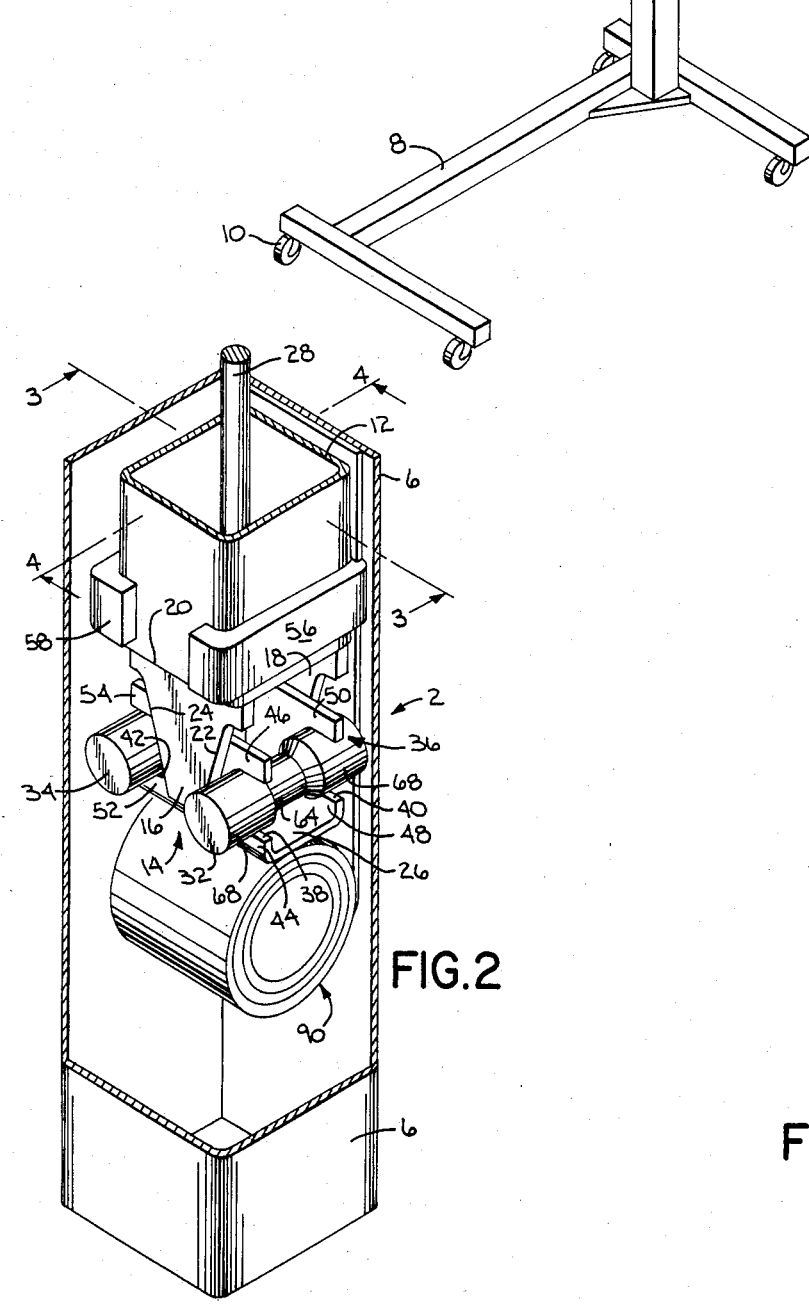
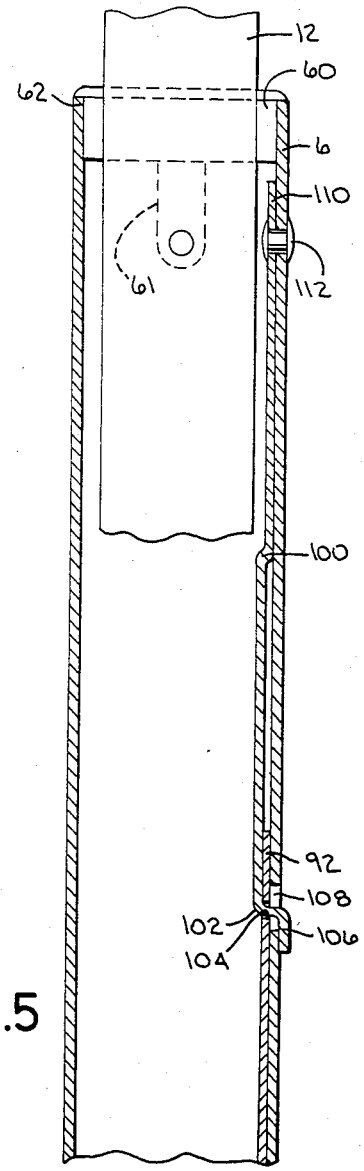

FIG.3
FIG.4
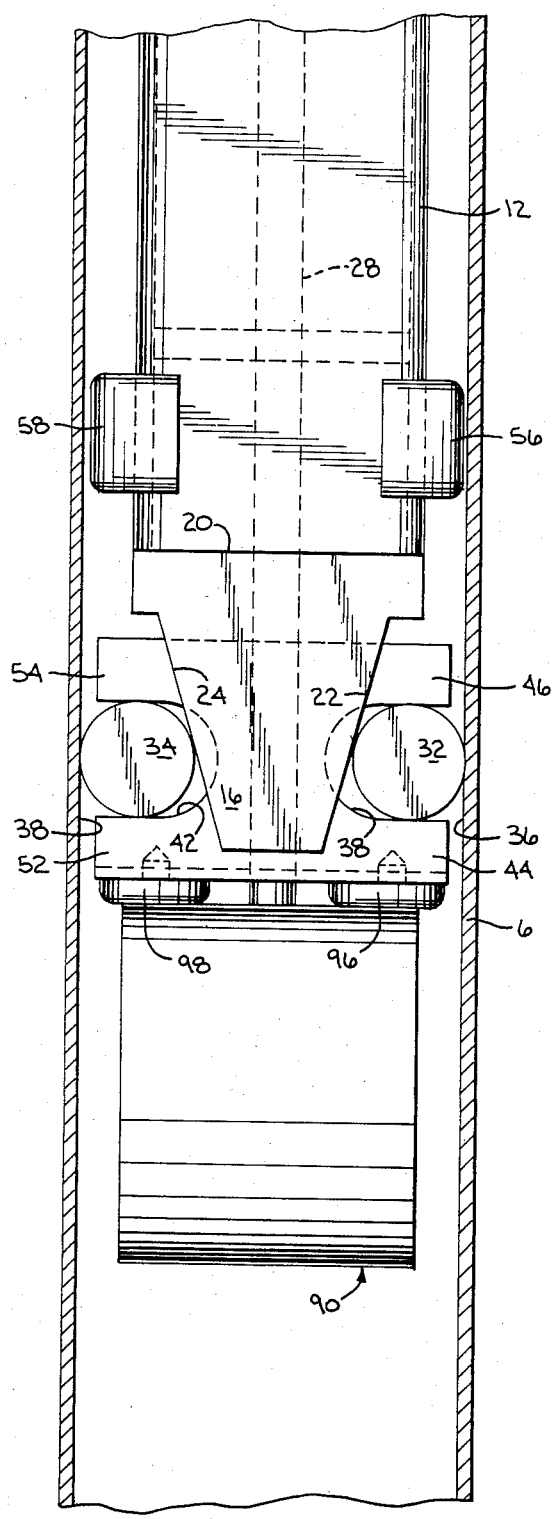
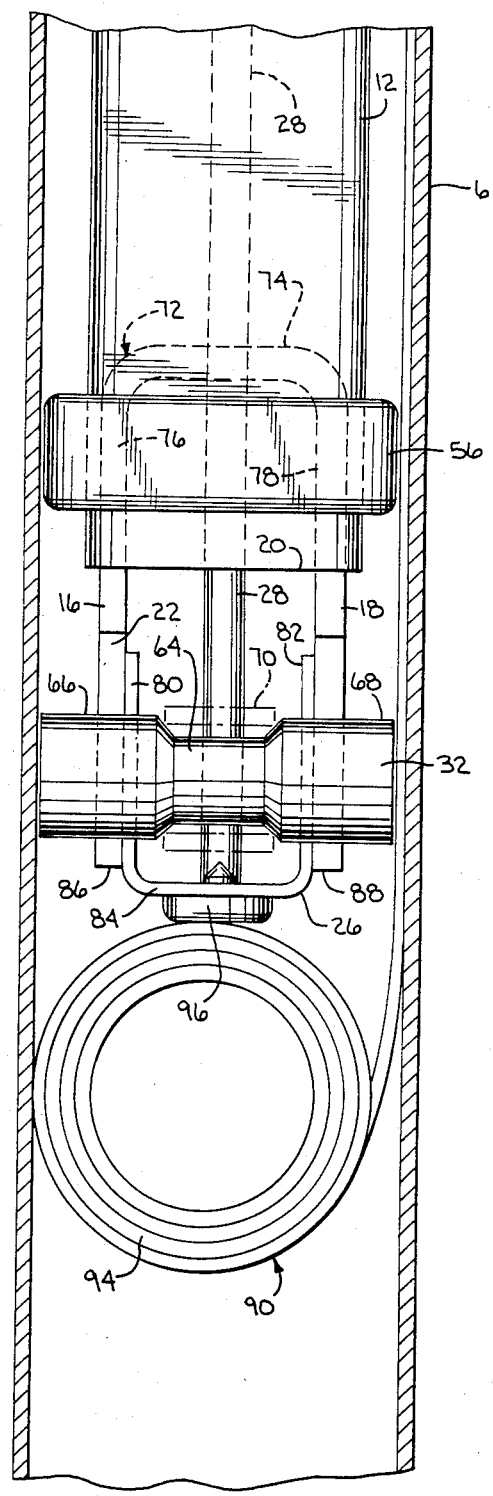

SUPPORT ASSEMBLY FOR OVERBED TABLE

BACKGROUND AND SUMMARY

The invention relates to overbed tables. Such tables are used in hospitals, nursing homes and the like where there is a need for a table which may be raised and lowered for a use by a person in a bed or a chair.

Overbed tables typically have a wheeled base supporting a vertical pedestal column which telescopically receives another vertical pedestal column which supports a table. The base is typically wheeled under the bed, with the table extending over the patient lying or sitting on the bed. The pedestal columns are vertically moveable relative to each other and have a latching mechanism for locking the columns and hence the table in a given desired vertical position.

One type of latch mechanism for an overbed table is the ratchet and pawl type wherein a vertical element has a series of holes or dents into which a pin or pawl is inserted. One of the objections to this mechanism is that it does not afford infinite type adjustment. Another objection is that it can come to rest with the pawl out of engagement with the ratchet, so that the table falls to the first available hole when load is applied.

Another latching mechanism is the clutch spring type. This mechanism provides infinite adjustment, however the conversion of rotary action of the clutch mechanism to the vertical linear action of the table usually results in an expensive overall design.

Another mechanism for latching and supporting overbed tables is the cam plate type. This mechanism is similar to the ratchet and pawl type, but a plate is pivotally mounted to the vertically moving column in a near horizontal plane and is forced into contact with the inner surface of the fixed column by a spring. As load is applied, the plate rotates to a more nearly horiztonal position digging one edge into the fixed column. After repeated uses of the latch, the inner surface of the outer column has numerous dents caused by the latch plate. Operation of the table becomes noisy, and operation of the release mechanism requires considerable force. This mechanism is also very sensitive to tolerances of the parts during construction.

The present invention provides a support assembly for an overbed table employing a wedge and roller clutch mechanism for latching the table, including particularly desirable wedge and roller clutch structure and features. The present support assembly is simple in design, and affords efficiency in manufacturing assembly. A valuable aspect of the design is its adaptability to a wide range of part tolerances, thus affording economical manufacture.

The invention is further characterized by its highly desirable operating characteristics, including counterbalancing of the table, aiding lifting thereof, and silent vertical positioning of the table, which is particularly desirable in hospitals and nursing homes.

BRIEF DESCRIPTION OF THE DRAWINGS

FIG. 1 is an isometric illustration of a support assembly and overbed table in accordance with the invention.

FIG. 2 is a cut away isometric view of a portion of FIG. 1 illustrating a support assembly in accordance with the invention.

FIG. 3 is a cross sectional view taken along line 3—3 of FIG. 2.

FIG. 4 is a cross sectional view taken along line 4—4 of FIG. 2.

FIG. 5 is cross sectional view along the same orientation as FIG. 4, showing a portion of FIG. 1 above that shown in FIG. 4.

DETAILED DESCRIPTION

FIGS. 1 and 2 show a support assembly 2 for an overbed table 4. A lower pedestal column 6 is mounted on a base 8 having wheels such as 10. An upper pedestal column 12 is telescopically slideable vertically within lower column 6, and supports table 4 at its upper end. A wedge and roller clutch 14 is at the bottom of upper column 12 and includes wedges 16 and 18 fixed to upper column 12 and extending downwardly from the lower end 20 thereof, and having opposing camming surfaces such as 22 and 24, for example in truncated V-shaped configuration. Retainer means 26 is mounted to release means such as vertically extending rod 28 extending upwardly centrally within the columns to release lever 30, and is moveable up and down toward and away from the bottom end 20 of upper column 12. Roller means provided by rollers 32 and 34 are loosely received in retainer 26 and forced laterally horizontally outwardly, FIG. 3, against the inner walls 36, 38 of lower column 6 by camming surfaces such as 22 and 24 of wedges 16 and 18 to stop downward movement of upper column 12, and thus support table 4. Downward movement of release rod 28 and retainer 26 permits lateral inward movement of rollers 32 and 34 out of forced cammed engagement with inner walls 36 and 38 of lower column 6, to permit downward movement of upper column 12 and table 4.

Retainer 26 is rigidly secured to release rod 28 and includes positive break disengagement means 36 positively forcing the rollers such as 32 downwardly during downward movement of release rod 28 and retainer 26 to release the rollers from their forced cammed engagement with the inner walls of lower column 6. In the embodiment in the FIGS. 2 and 3, the positive break disengagement means 36 includes a pair of laterally spaced slots for each roller proximate the distal ends of the respective roller, such as slots 38 and 40 for roller, 32 and slot 42 and a slot unshown for roller 34. Each slot extends laterally horizontally and is formed by a pair of vertically spaced laterally extending retainer ears, such as ears 44 and 46 for slot 38, ears 48 and 50 for slot 40, and ears 52 and 54 for slot 42. Each roller is retained between the pair of upper ears proximate its distal ends, such as upper ears 46 and 50 for roller 32, and the pair of lower ears proximate its distal ends, such as ears 44 and 48, to prevent slewing or canting of the roller within retainer 26. Upward movement of retainer 26 and release rod 28 causes the lower ears such as 44 and 48 to force the roller such as 32 upwardly against camming surfaces such as 22 of the wedges such as 16 to force the roller laterally outwardly to be in position ready for forced cammed engagement with inner wall 36 of lower column 6 to support upper column 12 and table 4. Downward movement of retainer 26 and release rod 28 causes the upper ears such as 46 and 50 to positively drive the roller such as 32 downwardly, permitting lateral inward movement of roller 32 out of forced cammed engagement with inner wall 36 of lower column 6. The upper port such as 46, 50 and 54 thus provide positive break disengagement means.

Silencer guide means provided by a pair of shallow U-shaped members 56 and 58 are mounted around at least part of the outer periphery of upper column 12 proximate its bottom end 20. Second silencer guide means, also provided by a pair of shallow U-shaped members, one of which is shown at 60 in FIG. 5, are mounted by riveted anchor tabs such as 61 around at least part of the inner periphery of lower column 6 proximate its upper end 62. The guides separate the columns to prevent galling therebetween. The columns are typically made of steel, and the guides are either much harder than the columns, or are much softer, such as nylon, and have a low coefficient of friction relative to the columns to provide smooth quiet operation and silent guided gliding therealong.

Each roller such as 32 has a reduced diameter central section 64, FIGS. 2 and 4, between larger diametered distal end sections 66 and 68. The ears of retainer 26 engage the roller at the larger diametered distal end sections, as shown by ears 44 and 46 engaging larger diametered distal end section 68, and ears 48 and 50 engaging larger diametered distal end section 68. In one modification, a resilient tubing member, shown in dashed line at 70 in FIG. 4, for example vinyl, nylon or the like, surrounds reduced diameter central section 64 of each of the rollers such as 32 and engages the inner wall 36 of lower column 6 during upward movement of upper column 12 and table 4 to prevent contact of roller 32 with inner wall 36 of the lower column during such upward movement to further reduce noise. When roller 32 is in forced cammed engagement with inner wall 36 of lower column 6 to support table 4, FIG. 3, resilient tubing member 70 is deformed and compressed toward reduced diameter central section 64 of roller 32 such that distal end sections 66 and 68 engage inner wall 36 of lower column 6 to stop downward movement of upper column 12 and table 4.

As seen in FIGS. 3 and 4, wedges 16 and 18 are provided by a downwardly facing U-shaped member 72 having a lateral bight portion 74 within upper column 12 and having root ends 76 and 78 secured to the inner walls of upper column 12 proximate its lower end 20. U-shaped member 72 has downwardly extending lower legs 16 and 18 of the noted generally V-shaped configuration. Retainer 26 is a generally upwardly facing U-shaped member having its upper legs 80 and 82 facing the inner surfaces of downwardly extending legs 16 and 18 of U-shaped wedge member 72 generally centrally of the V-shape. The U-shaped retainer member 26 has a lateral bight section 84 proximate the lower extent 86 and 88 of the V-shaped downwardly extending legs 16 and 18 of U-shaped wedge member 72. The downwardly extending V-shaped legs 16 and 18 of U-shaped wedge member 72 are laterally spaced left-right, FIG. 4. The upwardly extending legs 80 and 82 of U-shaped retainer member 26 are laterally spaced left-right and slide up-down along the inner facing surfaces of V-shaped downwardly extending legs 16 and 18 of U-shaped wedge member 72.

The upwardly extending legs 80 and 82 of U-shaped retainer member 26 each have the above noted forwardly and rearwardly laterally extending vertically spaced upper and lower ears defining laterally forwardly and rearwardly extending slots therebetween. Left forward lateral slot 38 is formed between the left forward upper and lower ears 46 and 44 of the left leg 80 of U-shaped retainer member 26. Right forward lateral slot 40 is formed between the right forward upper and lower ears 50 and 48 of the right leg 82 of U-shaped retainer member 26. Left rearward lateral slot 42 is formed between the left rearward upper and lower ears 54 and 52 of the left leg 80 of U-shaped retainer member 26. Likewise, a right rearward lateral slot, not shown, is formed between the right rearward upper and lower ears, not shown, of the right leg of U-shaped retainer member 26.

Roller 32 is loosely engaged in the left forward and right forward lateral slots 38 and 40. Roller 32 is engaged proximate its left end between left forward upper ear 46 and left forward ear lower 44, and is engaged proximate its right end between right forward upper ear 50 and right forward lower ear 48. Roller 32 has a limited degree of lateral forward-rearward free movement or lost motion in the left and right forward lateral slots 38 and 40. Roller 34 is comparable.

A counterbalancing constant force return spring 90 biases retainer 26 upwardly both to reduce the effort needed to lift table 4 and to bias each of rollers 32 and 34 to a proper camming position to be cammed by camming surfaces such as 22 and 24 of wedges 16 and 18 to a latched condition to support the table. Spring 90 biases lower ears such as 44, 48 and 52 upwardly to engage their respective roller such as 32 and 34. The roller engages the undersides of the upper ears such as 46, 50, and 54. The roller is biased upwardly into engagement with camming surfaces such as 22 of the wedge which in turn aides upper movement of upper column 12 and table 4.

Return spring 90 comprises a planar sheet-like resilient member, such as spring steel, having an upper end 92, FIG. 5, fixed to lower column 6, and having a lower end 94, FIG. 4, curled in a multiloop coil. Retainer 26 includes silencing and separating means in the form of buttons or contact pads 96 and 98 mounted to the underside thereof, and which are much harder than spring 90, or much softer, such as nylon. Coil 94 bears upwardly against members 96 and 98. Silencing and separating members 96 and 98 prevent contact between coiled end 94 of spring 90 and bight 84 of retainer 26, which is typically steel, to prevent galling therebetween as coiled end 94 reels in and out during upward and downward movement of upper column 12. Coiled end 94 would otherwise slide and uncoil against and along the bottom underside of bight 84 of retainer 26. Silencing and separating means 96 and 98 have a low coefficient of friction relative to spring 90 to provide smooth and quiet operation as the coil 94 slides circumferentially against silencing and separating members 96 and 98.

Upper end 92 of spring 90 is fixed to lower column 6 by an anchoring member 100, FIG. 5, having a lower hook portion 102 receiving upper end 92 of spring 90 prior to installation and insertable downwardly into the interior of lower column 6. Lower hook portion 92 extends through an aperture 104 in the upper end 92 of spring member 90. Anchor member 100 has a lower hook tip end 106 maneuverable outwardly through an aperture 108 in lower column 6. Anchor member 100 has an upper end 110 securable to the wall of lower column 6 near the top of the latter, for example by means of a rivot 112 or the like near the top of lower column 6. This attachment is easily facilitated because it is near the upper end 62 of lower column 6 and is thus readily accessible. The upper end 92 of spring 90 is thus maintained along the inner wall 36 of lower column 6 at lower hook portion 102 of anchor member 100 adjacent aperture 108. This is followed by assembly insertion of upper column 12 downwardly into lower column 6.

It is thus seen that there is provided a support assembly 2 for an overbed table 4 having a pair of vertical telescoping upper and lower columns 12 and 6, and including a wedge and roller clutch mechanism 14 between the columns together with a counterbalancing constant force spring 90. The wedge and roller clutch mechanism includes wedge means 16 and 18 fixed to the bottom of upper column 12. Rollers 32 and 34 are retained by moveable retainer 26 between a first latched position, FIG. 3, between wedges 16, 18 and inner surfaces 36, 38 of lower column 6 to stop downward movement of upper column 12 and support the table 4, and an unlatched condition permitting lateral inward movement of rollers 32, 34 out of forced engagement with inner surfaces 36, 38 of lower column 6 to permit downward movement of upper column 12 and table 4. Constant force spring 90 bears against the bottom of the retainer means to bias the latter upwardly such that rollers 32, 34 engage wedges 16, 18 and are lightly cammed laterally outwardly in slots 40, 42 into engagement with inner surfaces 36, 38 of lower column 6 to be immediately ready for downward loading on upper column 12 and table 4.

It is recognized that various modifications are possible within the scope of the appended claims.

I claim:

1. A support assembly for an overbed table comprising:

a lower pedestal column mounted on a base;

an upper pedestal column telescopically slideable within said lower column, and supporting said table;

a wedge and roller clutch at the bottom of said upper column, comprising:

wedge means fixed to said upper column and extending downwardly from the lower end thereof and having opposing camming surfaces;

retainer means mounted to release means and movable up and down toward and away from the bottom of said upper column; and roller means loosely received in said retainer means and forced laterally horizontally outwardly against the inner wall of said lower column by said camming surfaces of said wedge means to stop downward movement of said upper column and support said table, downward movement of said release means and said retainer means permitting lateral inward movement of said roller means out of forced cammed engagement with said inner wall of said lower column, to permit downward movement of said upper column and table; wherein:

said retainer means includes positive break disengagement means positively forcing said roller means downwardly during downward movement of said release means and retainer means to release said roller means from said forced cammed engagement with said inner wall of said lower column;

said roller means comprises one or more rollers;

said positive break disengagement means of said retainer means comprises a pair of laterally spaced slots for each said roller proximate the distal ends of the respective said roller, each slot extending laterally horizontally and formed by a pair of vertically spaced laterally extending retainer ears such that each roller is retained between a pair of upper ears proximate its distal ends and a pair of lower ears proximate its distal ends to prevent slewing or canting of the roller within said retainer means, upward movement of said retainer means and release means causing said lower ears to force said roller upwardly against said camming surfaces of said wedge means which forces said roller laterally outwardly to be in position ready for forced cammed engagement with said inner wall of said lower column to support said upper column and table when loaded, downward movement of said retainer means and release means causing said upper ears to positively drive said roller downwardly permitting lateral inward movement of said roller out of forced cammed engagement with said inner wall of said lower column;

each said roller has a reduced diameter central portion between larger diametered distal end sections, and wherein said ears of said retainer means engage said roller at said larger diametered distal end sections;

and further comprising a resilient tubing member surrounding said reduced diameter central section of said roller and engaging said inner wall of said lower column during upward movement of said upper column and table to prevent contact of said roller with said inner wall of said lower column during said upward movement to further reduce noise, and such that when said roller is in said forced cammed engagement with said inner wall of said lower column to support said table, said resilient tubing member is deformed and compressed toward said reduced diameter central section of said roller such that said distal end sections of said roller engage said inner wall of said lower column to stop downward movement of said upper column and table.

2. A support assembly for an overbed table comprising:

a lower pedestal column mounted on a base;

an upper pedestal column telescopically slideable within said lower column, and supporting said table;

a wedge and roller clutch at the bottom of said upper column, comprising:

wedge means fixed to said upper column and extending downwardly from the lower end thereof and having opposing camming surfaces;

retainer means mounted to release means and movable up and down toward and away from the bottom of said upper column; and roller means loosely received in said retainer means and forced laterally horizontally outwardly against the inner wall of said lower column by said camming surfaces of said wedge means to stop downward movement of said upper column and support said table, downward movement of said release means and said retainer means permitting lateral inward movement of said roller means out of forced cammed engagement with said inner wall of said lower column, to permit downward movement of said upper column and table; wherein:

said retainer means includes positive break disengagement means positively forcing said roller means downwardly during downward movement of said release means and retainer means to release said roller means from said forced cammed engagement with said inner wall of said lower column;

said roller means comprises one or more rollers;

said positive break disengagement means of said retainer means comprises a pair of laterally spaced slots for each said roller proximate the distal ends of the respective said roller, each slot extending laterally horizontally and formed by a pair of vertically spaced laterally extending retainer ears such that each roller is retained between a pair of upper ears proximate its distal ends and a pair of lower ears proximate its distal ends to prevent slewing or canting of the roller within said retainer means, upward movement of said retainer means and release means causing said lower ears to force said roller upwardly against said camming surfaces of said wedge means which forces said roller laterally outwardly to be in position ready for forced cammed engagement with said inner wall of said lower column to support said upper column and table when loaded, downward movement of said retainer means and release means causing said upper ears to positively drive said roller downwardly permitting lateral inward movement of said roller out of forced cammed engagement with said inner wall of said lower column;

and further comprising a counterbalancing return spring biasing said retainer means upwardly to both reduce the effort needed to lift the table and bias each of said rollers to a proper camming position to be cammed by said camming surfaces of said wedge means to a latched condition to support the table, said spring biasing said lower ears upwardly to engage their respective said roller, said roller engaging the undersides of said upper ears, said roller being biased upwardly into engagement with said camming surfaces of said wedge means which in turn aids upward movement of said upper column;

wherein said return spring comprises a planar sheet-like resilient member having an upper end fixed to said lower column and having a lower end curled in a coil and bearing upwardly against silencing and separating means mounted to the underside of said retainer means, said silencing and separating means preventing contact between said coiled end of said spring and said underside of said retainer means to prevent galling therebetween as said coiled end reels in and out during upward and downward movement of said upper column, which coiled end would otherwise slide and uncoil against and along said underside of said retainer means, said silencing and separating means having a low coefficient of friction relative to said spring to provide smooth and quiet operation as said coil slides circumferentially against said silencing and separating means.

3. The invention according to claim 2 wherein said upper end of said spring is fixed to said lower column by an anchor member having a lower hook portion receiving the upper end of said spring prior to installation and insertable downardly into the interior of said lower column and having a lower hook tip end maneuverable outwardly through an aperture in said lower column and an upper end securable to the wall of said lower column near the top of the latter while maintaining said upper end of said spring along the inner wall of said lower column at said lower hook portion of said anchor member adjacent said aperture, followed by assembly insertion of said upper column downwardly into said lower column.

4. A support assembly for an overbed table comprising:
  a lower pedestal column mounted on a base;
  an upper pedestal column telescopically slideable within said lower column, and supporting said table;
  a wedge and roller clutch at the bottom of said upper column, comprising:
    wedge means fixed to said upper column and extending downwardly therefrom and having opposing camming surfaces;
    retainer means mounted to release means and movable up and down toward and away from the bottom of said upper column, and
    roller means loosely received in said retainer means and forced laterally outwardly against the inner wall of said lower column by said camming surfaces of said wedge means to stop downward movement of said upper column and support said table, downward movement of said release means and said retainer means permitting lateral inward movement of said roller means out of forced cammed engagement with said inner wall of said lower column, to permit downward movement of said upper column, and table; and
  a counterbalancing constant force spring bearing upwardly against said retainer means to both reduce the effort needed to lift the table and bias said roller means to a proper camming position to be cammed by said wedge means to a latched condition to support the table; wherein:
said wedge means comprises a downwardly facing U-shaped member having a lateral bight portion within said upper column and having root ends of its legs secured to the inner walls of said upper column proximate its lower end, said U-shaped member having downwardly extending lower leg ends of generally V-shaped configuration;
said retainer means comprising a generally upwardly facing U-shaped member having its upper legs facing the inner facing surfaces of said downwardly extending legs of said U-shaped wedge member generally centrally of said V-shape, said U-shaped retainer member having a lateral bight section proximate the lower extent of said V-shaped downwardly extending legs of said U-shaped wedge member, said bight section of said U-shaped retainer member having silencing and separating means secured to its underside to engage said constant force spring and separate the latter from the underside of said bight section to prevent galling therebetween during operation.

5. The invention according to claim 4 wherein:
said downwardly extending V-shaped legs of said U-shaped wedge member are laterally spaced left-right;
said upwardly extending legs of said U-shaped retainer member are laterally spaced left-right and slide up-down along the inner facing surfaces of said V-shaped downwardly extending legs of said U-shaped wedge member, said upwardly extending legs of said U-shaped retainer member each having forwardly and rearwardly laterally extending vertically spaced upper and lower ears defining laterally forwardly and rearwardly extending slots therebetween, a left forward latera slot being formed between the left forward upper and lower ears of the left leg of said U-shaped retainer member, a right forward lateral slot being formed between the right forward upper and lower ears of the right leg of said U-shaped retainer member, a left rearward lateral slot being formed between the left rearward upper and lower ears of the left leg of said U-shaped retainer member, a right rearward lateral slot being formed between the right rearward upper and lower ears of the right leg of said U-shaped retainer member.

said roller means comprises a first roller loosely engaged in said left forward and right forward lateral slots, said first roller being engaged proximate its left end between said left forward upper ear and said left forward lower ear of said left leg of said U-shaped retainer member, said first roller being engaged proximate its right end between said right forward upper and said right forward lower ear of said right leg of said U-shaped retainer member, said first roller having a limited degree of lateral forward-rearward free movement or lost motion in said left and right forward lateral slots;

said roller means comprises a second roller loosely received in said left rearward and right rearward lateral slots, said second roller being engaged proximate its left end between said left rearward upper ear and said left rearward lower ear of said left leg of said U-shaped retainer member, said second roller being engaged proximate its right end between said right rearward upper ear and said right rearward lower ear of said right leg of said U-shaped retainer member, said second roller having a limited degree of lateral forward-rearward free movement of lost motion in said left and right rearward lateral slots.

* * * * *